(12) United States Patent
Sekela (10) Patent No.: US 6,359,282 B1
(45) Date of Patent: Mar. 19, 2002

(54) MODULAR RADIATION DETECTOR ASSEMBLY

(75) Inventor: William D. Sekela, Aurora, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 09/366,855

(22) Filed: Aug. 4, 1999

Related U.S. Application Data (60) Provisional application No. 60/097,679, filed on Aug. 24, 1998.

(51) Int. Cl.[7] ................................................. G01T 1/20
(52) U.S. Cl. ............................ 250/370.11; 250/363.02; 250/367; 250/370.09; 250/368
(58) Field of Search ....................... 250/370.11, 363.02, 250/367, 370.09, 368

(56) References Cited

U.S. PATENT DOCUMENTS 4,649,276 A * 3/1987 Suzuki .................. 250/370.11
5,753,919 A * 5/1998 Prain et al. ................. 250/368

* cited by examiner

*Primary Examiner*—Constantine Hannaher
*Assistant Examiner*—Andrew Israel
(74) *Attorney, Agent, or Firm*—Donald Bulson; Volker Ulbrich (57) ABSTRACT

A modular radiation detector includes a scintillator module containing a crystal, and an electronics module containing a light sensing device such as a photomultiplier tube (PMT), and an electronics package. The scintillator module and the electronics module are releaseably mechanically coupled, for example by means of mating threaded portions on each of the modules. The crystal and the PMT are optically coupled via an optical window in the scintillator module and a removable gel pad which is pressed between the modules as they are mechanically coupled together.

38 Claims, 4 Drawing Sheets

MODULAR RADIATION DETECTOR ASSEMBLY

This application claims the benefit of the provisional application No. 60/097,679 filed on Aug. 24, 1998.

FIELD OF THE INVENTION

The invention herein described relates generally to a radiation detector assembly and a method for assembling the same. The radiation detector assembly is particularly useful for well bore hole logging applications, but may also have use in other applications.

DESCRIPTION OF THE RELATED ART

Radiation detectors have been employed in the oil and gas industry for well logging. These detectors have used thallium-activated sodium iodide crystals that are effective in detecting gamma rays. The crystals are enclosed in tubes or casings to form a crystal package. The crystal package has an optical window at one end of the casing which permits radiation-induced scintillation light to pass out of the crystal package for measurement by a light sensing device, such as a photomultiplier tube (PMT) coupled to the crystal package. The PMT converts the light photons emitted from the crystal into electrical pulses that are shaped and digitized by associated electronics. Pulses that exceed a threshold level are registered as counts that may be transmitted "uphole" by wire to analyzing equipment or stored locally.

The ability to detect gamma rays makes it possible to analyze rock strata surrounding the bore holes, as by measuring the gamma rays coming from naturally occurring radioisotopes in down-hole shales which bound hydrocarbon reservoirs. Today, a common practice is to make measurements while drilling (MWD). For MWD applications, the detector must be capable of withstanding high temperatures and also must have high shock resistance. At the same time, there is a need to maintain performance specifications.

In a typical integrated detector assembly, a crystal package, a photomultiplier tube, and a voltage divider are enclosed in a housing. Some view the PMT as the weakest link in the assembly and have required the PMT to be field-replaceable. In the past, this field replacement capability has been accomplished by using a threaded shield cap on the back side of a PMT casing. The cap can be removed to permit removal and replacement of the PMT.

However, it is important that the integrity of the detector assembly be preserved after a field replacement. Among other things, proper loading of the PMT is important from a shock and vibration standpoint, especially in MWD applications. The PMT needs to be loaded in such a manner both radially and axially in its housing so that it does not move under certain vibration responses. If it does move, static discharges may be created which may be mistaken for light events emanating from the crystal, thereby causing inaccurate readings.

From the foregoing it can be seen that it would be desirable to have a radiation detector assembly that can be disassembled in the field for replacement of a PMT, and yet maintain performance integrity after it is reassembled.

SUMMARY OF THE INVENTION

The present invention provides a modular radiation detector assembly and method characterized by a scintillator module containing a scintillator such as a scintillator crystal, and an electronics module containing a light sensing device such as a photomultiplier tube (PMT). The scintillator module and the electronics module are releaseably mechanically coupled, for example by means of mating threaded portions on each of the modules. The crystal and the PMT are optically coupled under a prescribed loading determined by the mechanical coupling. Preferably, a resilient optical interface such as a gel pad is pressed between an optical window of the scintillator module and window side of the electronics module when the modules are mechanically coupled together.

Thus, according to one aspect of the invention, a scintillator module is releaseably mechanically coupled to an electronics module.

According to another aspect of the invention, a radiation detector includes a scintillator module having a casing and a scintillation crystal within the casing, and an electronics module having a photodetector casing and a light sensing device within the photodetector casing, wherein the crystal and the light sensing device are optically coupled, and the crystal casing and the photodetector casing are releaseably mechanically coupled.

According to yet another aspect of the invention, a radiation detector includes a hermetically-sealed scintillator module and an electronics module, the modules being releaseably mechanically coupled via threaded portions on each of the modules. The threaded portion of the electronics module preferably is made of a softer material than the threaded portion of the scintillator module.

According to a further aspect of the invention, a radiation detector includes a scintillator module which is releaseably coupled to an electronics module. The electronics module includes a light sensing device, and a resilient biasing device which urges the light sensing device toward the scintillator module. The detector also includes an optical coupling device between the scintillator module and the electronics module, wherein the thickness of the optical coupling device affects the axial load placed on the light sensing device by the resilient biasing device.

According to a still further aspect of the invention, a radiation detector includes a scintillator module having a scintillator, an electronics module having a light sensing device, means for releaseably mechanically coupling the scintillator module and the electronics module, and means for optically coupling the crystal and the light sensing device.

According to another aspect of the invention, an electronics module for use in a radiation detector assembly includes a light sensing device and a photodetector casing circumscribing the light sensing device. The photodetector casing has a coupler at an inner end for mechanically coupling with a scintillator module. The light sensing device preferably is slidable within the casing under a biasing force.

According to still another aspect of the invention, a scintillation module for use in a radiation detector assembly includes a scintillator and a casing surrounding the scintillator, the casing housing a coupler at an optical window end therein for coupling with an electronics module.

According to yet another aspect of the invention, a method of using a radiation detector assembly includes the steps of mechanically coupling a scintillator casing of a scintillator module and a photodetector casing of an electronics module, and optically coupling a scintillator of the scintillator module and a light sensing device of the electronics module.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION

Figure 1:
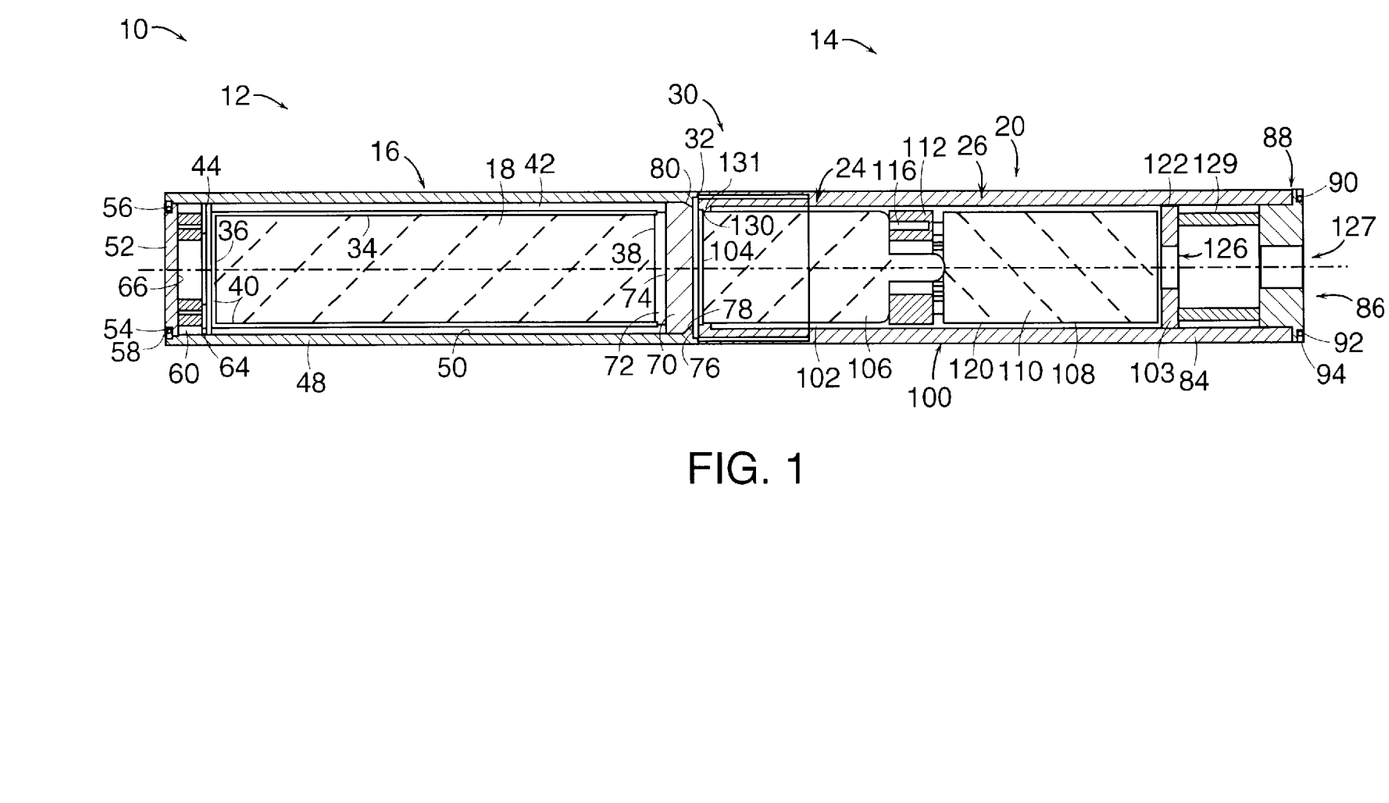
FIG. 1 is a longitudinal sectional view of a radiation detector assembly according to the present invention, including a scintillator module at the left and an electronics module at the right.

Referring now in detail to the drawings, FIG. 1 illustrates an exemplary and preferred radiation detector assembly 10 according to the present invention. The detector assembly 10 includes a scintillator module 12 and an electronics module 14. The scintillator module 12 includes a scintillator housing 16 which encloses a scintillator such as scintillation crystal 18. The electronics module 14 includes an outer housing 20 which circumscribes a light sensing device such as a photomultiplier tube (PMT) 24, and an electronics package 26 which is electrically connected to the PMT 24.

The scintillator module 12 and the electronics module 14 are releasably coupled in an interface region 30 via mating threads, with an optical coupling device such as a resilient, transparent pre-cast gel pad 32 between the modules 12 and 14. The gel pad 32 serves the purposes of optically coupling the scintillator module 12 to the electronics module 14, and also cushions the internal components of the electronics module 14, as explained in greater detail below.

The illustrated scintillation crystal 18 has a cylindrical surface 34 and flat end faces 36 and 38, the surface finish of which may be sanded, polished, ground, etc., as desired. The crystal 18 may be, for example, a thallium-activated sodium iodide crystal as in the illustrated embodiment. Alternatively, other crystal materials, such as a cesium iodide crystal, may be employed. The crystal 18 is surrounded at its cylindrical surface 34 and axial end face 36 by a layer 40 of reflecting material provided between the crystal 18 and, respectively, a support boot 42 and a cushion pad 44. The layer 40 of reflecting material preferably is formed by a white thin porous unscintered polytetrafluoroethylene (PTFE) film sold under the trademark TETRATEC available from Tetratec Corporation of Feasterville, Pa., PTFE sold under the trademark "TEFLON" of the DuPont de Nemours Company of Wilmington, Del., or the like. Since the PTFE is porous, air or gas can escape from between the layer 40 and both the cylindrical surface 34 and the end face 36 of the crystal 18, to avoid pockets of trapped air or gas. Such pockets are usually undesirable, since trapped air or gas could have a negative impact on the reflectivity at the layer-crystal interface. The porous PTFE film 40 is tightly wrapped around the crystal 18 and is generally self-adhering to the cylindrical surface 34 and the end face 36 of the crystal 18.

The support boot 42 closely surrounds and preferably tightly grips the layer 40 of reflecting material to aid in holding the reflector material 40 tightly against the crystal 18. As shown, the boot 42 is cylindrical and concentric with both the crystal 18 and a scintillator casing 48 which is part of the scintillator housing 16. The boot 42 is made of resilient material and preferably silicone rubber such as, for example, a Sylgard 186/184 blend elastomer or more preferably Sylgard 170 silicone elastomer, the latter being a fast setting silicone elastomer. "Sylgard" is a trademark of the Dow Chemical Company of Midland, Mich. The boot 42 helps absorb shock to the crystal 18 in a radial direction. In addition, the resilient boot 42 maintains pressure against the layer 40 and an interior surface 50 of the casing 48, even as the scintillator module 14 changes temperature, maintaining the crystal 18 in place even during relative expansions or contractions of the crystal 18 and the casing 48.

An example of a support boot as part of a hermetically-sealed radiation detector is given in U.S. Pat. No. 4,994,673, issued to Perna, et al., entitled "Ruggedized Radiation Detector," the entire disclosure of which is incorporated herein by reference.

The scintillator housing 16 also includes a scintillator end cap 52 having an annular recess 54 which forms a welding flange 56. The welding flange 56 abuts welding flange 58 on the scintillator casing 48. A hermetic seal is formed between the end cap 52 and the scintillator casing 48 by welding along the welding flanges 56 and 58. Preferably the scintillator casing 48 and the end cap 52 are made of the same material, for example stainless steel.

Between the end cap 52 and the end face 36 of the crystal 18 are, from left to right in FIG. 1, a resilient biasing device such as a spring 60, a thrust plate 64, and the cushion pad 44.

The spring 60 may be a wave spring or springs or may alternatively include other types of resilient biasing devices, for example coil springs. The spring 60 may be mounted on a spring mount between the spring 60 and an interior surface 66 of the end cap 52.

The thrust plate 64 functions to spread the spring force of the spring across the transverse area of the cushion pad 44 for substantially uniform application of pressure and axial loading to the crystal 18. The cushion pad 44 is made of a resilient material and preferably a silicone rubber (elastomer) to which a reflecting material such as aluminum oxide powder may be added.

The spring 60 urges the crystal 18 rightward as shown in FIG. 1 toward an optical window 70. The optical window 70 is made of a material transmissive to scintillation light given off by the scintillation crystal 18. In the illustrated embodiment the optical window 70 is made of crown glass. Optical coupling is maintained between the end face 38 of the crystal 18 and the window 70 via a layer of suitable optical coupling material, such as an interface pad 72, positioned between the front end face 38 of the crystal 18 and an inner face 74 of the optical window 70. In the illustrated embodiment the interface pad 72 is a silicone rubber pad sandwiched between the crystal 18 and the optical window 70. Preferably the interface pad 72 is preformed prior to assembly of the scintillator module 12 and is not bonded to the crystal 18 and/or the optical window 70, such that there is a contact only at the interface between the interface pad 72 and the crystal 18 and/or the optical window 70. An exemplary material for the interface pad 72 is a blend, by weight, of ten parts Sylgard 186 base resin, one part Sylgard 186 curing agent, one part Sylgard 184 base resin and one part Sylgard 184 curing agent. The Sylgard resins are sold by Dow Corning Corporation of Midland, Mich.

The optical window 70 is retained in the scintillator casing 48 by an annular lip 76 on the scintillator casing 48. The lip 76 protrudes radially inwardly from the interior surface 50 of the scintillator casing 48 and defines an opening having a diameter less than the diameter of the window 70. The lip 76 has an axially inner beveled surface 78, and the optical window 70 has a correspondingly beveled, axially outer, circumferential edge surface 80 which seats against the beveled surface 78. The mating beveled surfaces are hermetically sealed by a high temperature solder such as 95/5 or 95/10 lead/tin solder. The solder also aids in restraining the window 70 against axial push-out, although its primary function is to effect a high temperature seal. As is apparent from the foregoing, the window 70 is axially trapped between the lip 76 and the interface pad 72, and is radially constrained by the interior surface 50 of the scintillator casing 48. To permit wetting of the glass by the solder, the sealing edge surfaces of the window 70 have applied thereto a metalized coating such as platinum.

Although the scintillator module has been described above as involving a hygroscopic crystal encased in a hermetically sealed housing with scintillation light leaving the module through an optical window, it will be appreciated that other types of crystals or scintillators may be employed, not necessarily involving enclosure in a hermetically-sealed housing.

In assembling the scintillator module 12, the optical window 70 is first attached to the scintillator casing 48. Then the interface pad 72, the crystal 18 and the support boot 42, the cushion pad 44, the thrust plate 64, and the spring 60 are all loaded, in that order. Finally the end cap 52 is pressed into place against force from the spring 60, and while the end cap 52 is held in place, it is welded to the scintillator casing 48.

Figure 2:
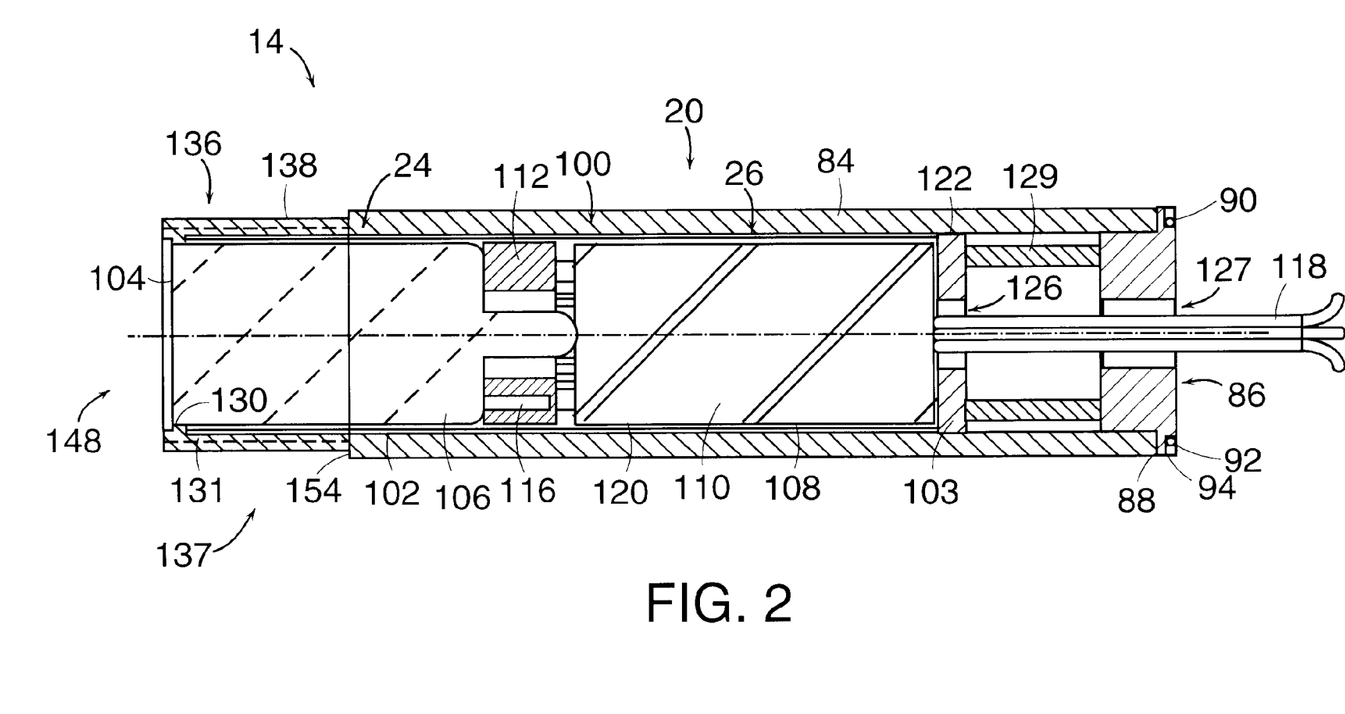
FIG. 2 is a longitudinal sectional view of the electronics module of the detector assembly of FIG. 1.

Referring now to FIG. 2, details of the electronics module 14 are shown. The outer housing 20 of the module 14 includes a photodetector casing 84 and an electronics module end cap 86. The end cap 86 has a stepped portion 88 with an annular recess 90 therein which forms a welding flange 92. The welding flange 92 abuts a welding flange 94 on the photodetector casing 84. The photodetector casing 84 and the end cap 86 are welded together where the welding flanges 92 and 94 abut. This weld need not necessarily be a hermetically-sealed weld. In fact, since the photodetector casing 84 and the end cap 86 may be made of dissimilar materials, the end cap 86 being made of stainless steel, for example, and the photodetector casing 84 possibly being made of a softer metal such as brass or aluminum, for example, it may be impractical to hermetically seal the end cap 86 to the photodetector casing 84.

Within the outer housing 20 is a PMT/electronics subassembly 100, which includes the PMT 24, the electronics package 26, a PMT/electronics sleeve 102, and a sleeve end cap 103. The PMT/electronics sleeve 102 circumscribes the PMT 24 and the electronics package 26, and is connected to the sleeve end cap 103.

The PMT 24 converts light incident on its face 104 into an electrical signal at its distal end 106. An exemplary PMT is phototube model number R1288-01, made by Hamamatsu Photonics K.K., of Hamamatsu City, Japan.

The electronics package 26 includes a tube 108, preferably made out of Teflon, which circumscribes electronics 110 and a potting material. The electronics 110 are connected at one end to the socket 112, which in turn is electrically connected with pins 116 at the distal end 106 of the PMT 24. The socket 112 is designed to mate with the pins 116. The socket 112 may be an off-the-shelf item designed to mate with the PMT 24, for example a socket manufactured and sold by Hamamatsu Photonics to mate with its R1288-01 phototube.

The electronics 110 power the phototube and process the output signal. The electronics may include a Cockcroft-Walton type power supply which alleviates the need for an external high voltage power supply. Alternatively, the electronics may include another power supply and may include a voltage divider.

At the opposite end of the electronics package 110, wires or other leads 118 are attached. The wires 118 pass out of the outer housing 20 and are connected to power supplies and devices for recording and/or outputting a signal.

The PMT 24 and the electronics package 26 are mechanically attached to the sleeve 102, which is preferably made of stainless steel. In the illustrated embodiment this mechanical attachment is accomplished by use of a potting material 120 between the tube 108 and the PMT 24 and the electronics package 26. It will be appreciated that the PMT 24 and the electronics package 26 may be mechanically secured within the PMT/electronics sleeve 102 by alternative means. For example, the PMT 24 and/or the electronics package 26 may be wrapped tightly with a material such that they would be frictionally secured within the sleeve 102 after being inserted. Alternatively, a mechanical stop may be provided along the inner surface of the PMT/electronics sleeve, for example in the region between the electronics package and the socket. Such a stop may be machined on the inner surface of the sleeve, or could be attached to the inner surface such as by a ring which may for example be epoxied to the inner surface of the PMT/electronics sleeve. The electronics package, which would be inserted into the subassembly from the right as shown in FIG. 2, would thereby be secured between the stop and the sleeve end cap after the sleeve end cap was secured to the PMT/electronics sleeve.

The sleeve end cap 103 is also preferably made of stainless steel. The sleeve end cap 103 has a step 122 along its circumference. The step 122 is used in securing the PMT/electronics sleeve 102 to the sleeve end cap 103. The sleeve 102 and the sleeve end cap 103 may be welded together, or may alternatively be epoxied together with a high temperature epoxy.

The sleeve end cap 103 has a hole 126 therethrough to allow passage of the wires 118.

The end cap 86 similarly has a hole 127 therein to allow passage of the wires 118 therethrough. The hole 127 is typically be sealed with the wires 118 passing therethrough by filling the hole 127 with an opaque black high temperature silicone potting material, which would provide a light-tight seal of the hole 127. Alternatively, an opaque epoxy could be used to provide a light tight seal that would also seal the hole 127 in the end cap 86 against pressure. If a stronger seal was desired, a hermetic conductor interface (pass-through) may be used to pass the electrical connections through the end cap. Such a hermetic interface may have a ceramic plug with embedded metal leads passing therethrough, the plug being joined to a metal body, which then may be welded to the end cap.

The PMT/electronics subassembly 100 is designed to slide within the photodetector casing 84. A resilient biasing device, such as a wave spring 129 between the sleeve end cap 103 of the PMT/electronics subassembly 100, and the end cap 86, urges the PMT/electronics subassembly 100 leftward as shown in FIG. 1. The PMT/electronics subassembly 100 is retained in the electronics module 14 by means of a stop 130 on the inner surface of the photodetector casing 84. The stop 130 may be formed as a shoulder on the sleeve 84 by machining, for example. Alternatively, the stop may be a ring that is secured to the photodetector casing by being placed in an annular slot in the sleeve, or by being attached to the sleeve by use of an adhesive, by welding, by soldering, or by other such means. The stop 130 protrudes enough to prevent passage of an end 131 of the PMT/electronics sleeve 102, but does not prevent passage of the PMT 24.

The electronics module 14 is assembled by first assembling the PMT/electronics subassembly 100. This is done by mechanically securing the PMT 24 and the electronics package 26 within the PMT/electronics sleeve 102, and by attaching the sleeve end cap 103 to the PMT/electronics sleeve 102. The PMT/electronics subassembly 100 is then loaded into the photodetector casing 84 against the stop 130. The spring 129 is then inserted into the photodetector casing 84. Thereafter, the end cap 86 is pressed down against the spring force from the spring 129, with the wires 118 protruding from the hole 127 in the end cap 86. The end cap 86 is then welded to the photodetector casing 84. Finally, the hole 127 is filled with a potting material, as described above.

Figure 3:
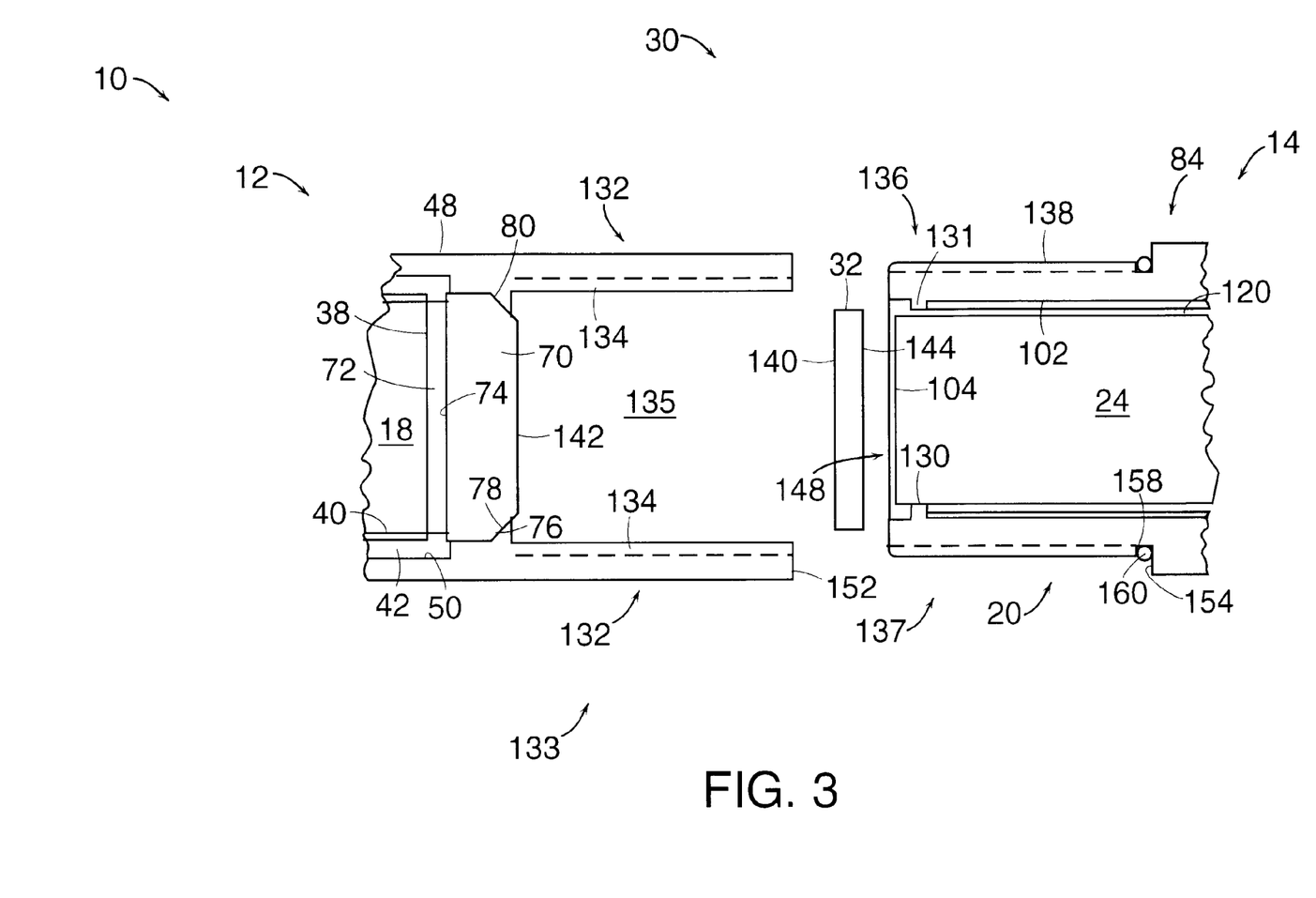
FIG. 3 is an exploded sectional view of the interface region of the detector assembly of FIG. 1.

Referring to FIG. 3, details of the connection between the scintillator module 12 and the electronics module 14 in the interface region 30 are shown. The casing 22 of the scintillator housing 16 has a threaded portion 132 on its inner or optical window end 133. The threaded portion 132 has an internal thread 134 to form a female threaded receptacle 135 which extends beyond the window 70. The photodetector casing 84 has a threaded portion 136 on its inner end 137. The threaded portion 136 has an external thread 138. The threaded portions 132 and 136 mate together, allowing the electronics module 14 to be releasably coupled to the scintillator module 12.

The gel pad 32 provides an optical interface between the window 70 and the end face 104 of the PMT 24. The gel pad 32 has a proximate surface 140 which contacts an outer face 142 of the window 70 when the detector assembly 10 is assembled, and a distal surface 144 which contacts the end face 104 of the PMT 24.

Prior to the coupling of the scintillator module 12 and the electronics module 14, the gel pad 32 is placed in a counter bore 148 of the photodetector casing 84, the distal surface 144 of the gel pad 32 being in contact with the end face 104 of the PMT 24. Optical grease may be used to improve the optical coupling of the distal surface 144 and the end face 104, and to provide some measure of adhesion between the gel pad 32 and the PMT 24. As the threaded portion 136 of the electronics module 14 is screwed into the threaded portion 132 of the scintillator module 12, the proximate surface 140 of the gel pad 32 eventually comes into contact with the outer face 142 of the window 70. Optical grease may be provided on the proximate surface 140 and/or the outer face 142 to enhance the optical coupling between the window 70 and the gel pad 32. As the modules 12 and 14 are further screwed together, the gel pad 32 is compressed, pushing against the PMT 24 via the end face 104. This resilient force from the gel pad 32 to the PMT 24 opposes the force of the wave spring 129. Eventually the resilient force from the gel pad 32 to the PMT 24 is large enough to overcome the force of the spring 129, thereby causing the PMT/electronics subassembly 100 to move rightward, the PMT/electronics sleeve 102 thereby moving off the stop 130.

This movement, rightward as shown in FIGS. 1–3, continues as the threaded portion 136 is further screwed into the threaded portion 132. The mechanical coupling between the scintillator module 12 and the electronics module 14 is controlled by a positive stop which limits tightening of the threaded portions 132 and 136, thereby fixing spacing between the modules 12 and 14, and the longitudinal load in the electronics module 14. In the illustrated embodiment this positive stop involves a distal end 152 of the scintillator casing 48 coming into contact with a shoulder 154 on the photodetector casing 84. With the distal end 152 in contact with the shoulder 154, the scintillator casing 48 and the photodetector casing 84 are joined together to present a smooth outer surface of the radiation detector assembly 10.

It will be appreciated that other mechanical couplings with positive stops may be employed, for example an end of a male portion contacting a shoulder on a female threaded portion.

The screwing together of the scintillator module 12 and the electronics module 14 sets the spring load on the PMT 24 such that there is a prescribed interface load between the PMT 24 and the optical gel pad 32.

While the connection has been described as involving a male thread on the electronics module and a female receptacle on the scintillator module, it will be appreciated that alternatively the male portion may be on the scintillator module, and the female portion may be on the electronics module.

Although the mating of the respectively self-contained scintillator module 12 and electronics module 14 has been described above as involving a screwing together of threaded mating parts, it will be appreciated that alternative coupling mechanisms may be employed which use mechanical interference such that upon full assembly the relative position of the PMT and the optical window are fixed. For example, a bayonet connector may be employed.

It will be appreciated therefore that the amount of longitudinal force on the PMT/electronics subassembly 100 depends upon the thickness of the gel pad 32, the spring force, and dimensional relationships between the optical window 70 and the PMT 24. Disassembly of the radiation detector assembly 10 and replacement of the gel pad 32 with another like gel pad will produce a similar longitudinal load within the electronics module 14 after the detector is reassembled. Similarly, disassembly and replacement of the electronics module 14 with another electronics module having a PMT with a similar dimensional relationship to the optical window 70 should produce a similar longitudinal load within the electronics module upon reassembly. Thus an end user of the detector assembly 10 can disassemble the detector and replace the gel pad or one of the modules, and still be able to achieve similar performance when the unit is reassembled. The radiation detector assembly 10 therefore offers field replaceability of parts while still maintaining unit performance within factory specifications.

It will further be appreciated that a variety of non-identical modules and/or gel pads may be maintained by the customer, with the customer able to determine which parts to assemble in order to meet his or her needs. For example, a thicker gel pad could be substituted if the detector was to be employed in an environment that made a larger longitudinal force on the PMT/electronics subassembly desirable. Gel pads could vary in thickness, for example, from 0.030 inches to 0.875 inches.

Electronics modules with different dimensional relationships between the PMT and the optical window (when assembled) and/or with different spring constants of the wave spring, may also be used to vary the loading on the PMT. Further, different electronics modules may be used for various applications, with the electronics designed and optimized for each application. Thus, different electronics modules could be swapped out with a single scintillator module, depending on the application for the radiation detector.

Also, for example, a switch to a different length crystal could be made merely by swapping scintillator modules, as opposed to having to replace the entire detector.

The gel pad 32 is made of a clear silicone-based material, and may be precast, similar to the interface pad 72. The gel pad 32 preferably has a thickness greater than the depth of the counterbore 148 so that the optical window 70 does not come into contact with photodetector casing 84.

It is desirable to have the gel pad 32 thin in order to have better optical performance. Increasing the thickness of the pad can cause wavelength mismatch and other degradation of the light signal passing through the pad. However, a thicker pad provides more shock attenuation, thus reducing the chance of breakage of the PMT. Thus it may be desirable to use a thick pad when increased shock attenuation is desired, and to replace that thicker pad with a thin pad in other circumstances when better optical performance is more important (in a relatively milder shock environment, for example).

In addition to the functions described earlier, the gel pad 32 also acts as a cushion for the PMT/electronics subassembly 100, and in particular for the PMT 24. As the detector assembly 10 is subjected to axial and/or radial loading due to vibration, for example, the gel pad 32, being made of a resilient material such as silicone, absorbs some of the shock that would otherwise be taken by the PMT 24.

The photodetector casing 84 of the electronics module 14 has an annular groove 158 in the vicinity of the shoulder 154. The groove 158 has an O-ring 160 therein. The O-ring 160 cooperates with the threaded portion 132 of the scintillator module 12 to seal the interface region 30 of the detector assembly 10 against ingress of contaminants when the detector assembly 10 is assembled.

Although the annular groove 158 and the O-ring 160 are shown in the illustrated embodiment as being next to the shoulder 154, it will be appreciated that the groove and O-ring may be located elsewhere along the threaded portion of the photodetector casing. It will further be appreciated that other sealing mechanisms may be employed.

It will be appreciated that the electronics module assembly may be provided with a dust cap or other such covering to prevent dust or other contaminants from entering the interior of the assembly 14 between the PMT 24 and the stop 130.

The photodetector casing 84 may be made of a softer material than the scintillator casing 48 in order to make the modules easier to separate. If both the scintillator casing 48 and the photodetector casing 84 were made of stainless steel, the threads on the two pieces may be difficult to unscrew after multiple heating and cooling cycles of the radiation detector assembly 10. Since the scintillator casing 48 is preferably made of stainless steel in order to facilitate hermetic welding of the scintillator end cap 52 to it, it is preferable to make the photodetector casing 84 out of aluminum, brass, or another material that is softer than stainless steel. The use of a softer material also facilitates a better seal in the interface region 30 between the threaded portions 132 and 136.

It will be appreciated that during the assembly the gel pad 32 may rotate relative to the window 70 and/or to the PMT 24. In addition to those functions described earlier, another function of the optical grease between the proximate surface 140 and the outer face 142, and between the distal surface 144 and the end face 104, is to facilitate a relatively friction-free rotation that may prevent damage and provide easier coupling of the modules 12 and 14.

Figure 4:
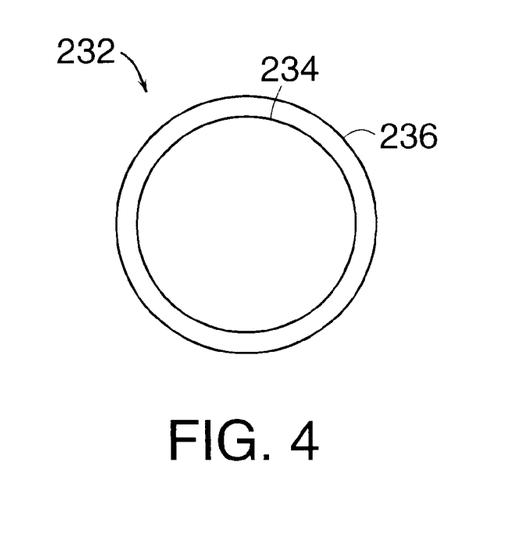
FIG. 4 is an end view of an alternate embodiment gel pad in accordance with the present invention which contains a radial groove for holding optical grease.
Figure 5:
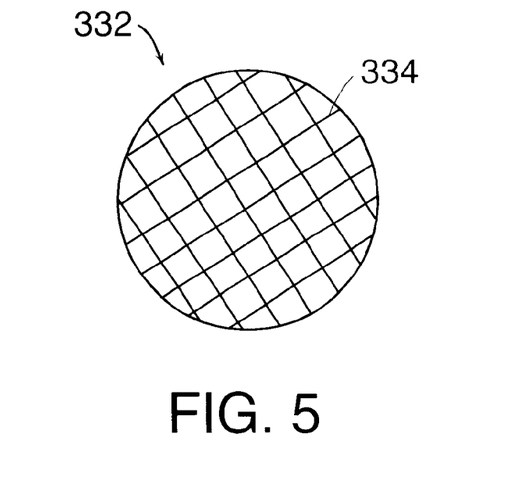
FIG. 5 is an alternate embodiment gel pad in accordance with the present invention which has a mesh of microgrooves for retaining optical grease.

It may be desirable to have a groove or grooves in the gel pad such that extra grease would be retained in the pad until the pad was pressed between the PMT and the optical window. FIGS. 4 and 5 show alternative gel pads having such grooves. FIG. 4 shows a gel pad 232 having a radial groove 234 near its perimeter 236. The groove 234 would be filled with optical grease which would be retained therein until sufficient pressure on the gel pad 32 released the grease from the groove 234. The groove 234 would preferably be located such that it would not block any of the light passing from the crystal 18 to the PMT 24. A typical groove may be 0.020 to 0.040 inches wide, with a depth that depends upon pad thickness.

FIG. 5 shows another alternative pad, a gel pad 332 having a mesh of microgrooves 334 to retain optical grease. The grooves 334 would preferably be small enough so as not to unacceptably degrade optical performance. A typical microgroove may be 0.010 inches wide and 0.010 inches deep.

It will be appreciated that many alternative groove designs may be utilized.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A radiation detector assembly comprising:
   a scintillator module including a scintillator casing and a scintillator within the casing; and
   an electronics module including a photodetector casing and a light sensing device within the photodetector casing;
   wherein the scintillator casing and the photodetector casing are releaseably mechanically coupled to bring the scintillator and the light sensing device into an optically coupled relationship; and
   wherein the light sensing device is axially movable within the photodetector casing and resiliently biased towards the scintillator.

2. The detector of claim 1, wherein the light sensing device is a photomultiplier tube.

3. The detector of claim 1, wherein the scintillator casing and the photodetector casing are releaseably coupled via mating threaded portions on inner ends of each of them.

4. The detector of claim 3, wherein the threaded portion of the scintillator casing and the threaded portion of the photodetector casing are made of different materials.

5. The detector of claim 4, wherein the scintillator casing is made of steel and the photodetector casing is made of a softer metal.

6. The detector of claim 1, wherein the scintillator is optically coupled to an optical window, and the detector further comprises an optical coupling device optically coupled to the window and to the light sensing device.

7. The detector of claim 1, wherein the scintillator module is hermetically sealed.

8. A radiation detector assembly comprising:
a scintillator module including a scintillator casing and a scintillator within the casing; and
an electronics module including a photodetector casing and a light sensing device within the photodetector casing;
wherein the scintillator casing and the photodetector casing are releaseably mechanically coupled to bring the scintillator and the light sensing device into an optically coupled relationship, and wherein the optical coupling device is a gel pad.

9. The detector of claim 8, wherein the pad is a silicone gel pad having at least one groove therein for holding optical grease.

10. A radiation detector assembly comprising:
a scintillator module including a scintillator casing and a scintillator within the casing; and
an electronics module including a photodetector casing and a light sensing device within the photodetector casing;
wherein the scintillator casing and the photodetector casing are releaseably mechanically coupled to bring the scintillator and the light sensing device into an optically coupled relationship, wherein the electronics module also includes a sleeve circumscribing and mechanically coupled to the light sensing device, and wherein a face of the light sensing device and an end of the sleeve are at an inner end of the electronics module.

11. The detector of claim 10, wherein the electronics module also includes a resilient biasing device which urges the end of the sleeve toward a stop on the photodetector casing.

12. The detector of claim 11, further comprising a transparent, resilient pad in contact with the face, wherein the pad pushes the end of the inner sleeve off the stop as the scintillator casing and the photodetector casing are mechanically coupled.

13. The detector of claim 10, wherein the electronics module also includes an electronics package circumscribed by and coupled to the inner sleeve and electrically coupled to the light sensing device.

14. A radiation detector comprising:
a scintillator module;
an electronics module releaseably coupled to the scintillator module, the electronics module including a light sensing device, and a resilient biasing device which urges the light sensing device toward the scintillator module; and
an optical coupling device between the scintillator module and the electronics module, wherein a thickness of the optical coupling device affects an axial load placed on the light sensing device by the resilient biasing device,
wherein the electronics module further includes a photodetector casing with a stop, the stop constraining motion of the light sensing device within the photodetector casing.

15. The device of claim 14, wherein the light sensing device is a photomultiplier tube.

16. The detector of claim 14, wherein the resilient biasing device is a spring.

17. A radiation detector comprising:
a scintillator module;
an electronics module releaseably coupled to the scintillator module, the electronics module including a light sensing device, and a resilient biasing device which urges the light sensing device toward the scintillator module; and
an optical coupling device between the scintillator module and the electronics module, wherein a thickness of the optical coupling device affects an axial load placed on the light sensing device by the resilient biasing device;
wherein the optical coupling device is a transparent gel pad.

18. The detector of claim 17, wherein the transparent gel pad includes at least one groove containing optical grease.

19. A radiation detector comprising:
a scintillator module;
an electronics module releaseably coupled to the scintillator module, the electronics module including a light sensing device, and a resilient biasing device which urges the light sensing device toward the scintillator module; and
an optical coupling device between the scintillator module and the electronics module, wherein a thickness of the optical coupling device affects an axial load placed on the light sensing device by the resilient biasing device;
wherein the electronics module further includes a photodetector casing with a stop, the stop constraining motion within the photodetector casing of the light sensing device and the optical coupling device.

20. A radiation detector comprising:
a scintillator module including a crystal enclosed within a scintillator module housing;
an electronics module including a light sensing device enclosed within an electronics module housing;
means for releaseably mechanically coupling the scintillator module housing and the electronics electronics module housing; and
means for optically coupling the crystal and the light sensing device; and
wherein the light sensing device is mounted within a sleeve that is axially movable within the electronics module housing.

21. The detector of claim 20, further comprising means for controlling an axial load on the light sensing device.

22. The detector of claim 21, wherein the light sensing device is a photomultiplier tube.

23. The detector of claim 20, further comprising means for preventing contaminants from entering the electronics module.

24. An electronics module for use in a radiation detector assembly, comprising:
a light sensing device; and
a photodetector casing circumscribing the light sensing device, the light sensing device being movable within the photodetector casing;

wherein the photodetector casing has a coupler at an inner end for mechanically coupling with a scintillator module.

25. The electronics module of claim 24, wherein the light sensing device is a photomultiplier tube having an end face at the inner end of the photodetector casing.

26. The electronics module of claim 24, wherein the coupler is a threaded portion of the photodetector casing.

27. The electronics module of claim 24, wherein the photodetector casing includes a counterbored portion at the inner end.

28. The electronics module of claim 24, further comprising a resilient biasing device which urges the light sensing device toward the inner end.

29. The electronics module of claim 24, wherein the photodetector casing has a mechanical stop therein which limits travel of the light sensing device.

30. A method of fabricating a radiation detector assembly, comprising the steps of:
    providing a scintillator module in which a scintillator is contained; and
    providing an electronics module in which a light sensing device is contained for optical coupling with the scintillator when the modules are coupled together and which has a threaded coupling device for releaseably mechanically coupling with a coupling device of the scintillator module.

31. The method of claim 30, further comprising the step of providing a group of non-identical scintillator modules each having a coupling device releaseably mechanically coupling with the coupling device of the electronics module.

32. The method of claim 30, wherein the coupling devices include screw threads.

33. A method of using a radiation detector assembly, comprising the steps of:
    mechanically coupling a scintillator casing of a scintillator module and a photodetector casing of an electronics module; and
    optically coupling a scintillator of the scintillator module and a light sensing device of the electronics module;
    wherein the optically coupling includes pressing an optical coupling device between the scintillator and the light sensing device as the scintillator module and the electronics module are mechanically coupled.

34. The method of claim 33, wherein the optical coupling includes releasing optical grease from a groove in the optical coupling device.

35. The method of claim 33, further comprising the step of selecting the optical coupling device from a group of non-identical optical coupling devices.

36. A method of using a radiation detector assembly, comprising the steps of:
    mechanically coupling a scintillator casing of a scintillator module and a photodetector casing of an electronics module; and
    optically coupling a scintillator of the scintillator module and a light sensing device of the electronics module;
    wherein the mechanically coupling includes screwing together mated threaded portions of the scintillator casing and the photodetector casing.

37. A scintillation module for use in a radiation detector assembly, comprising a scintillator and a casing surrounding the scintillator, the casing having a coupler at an optical window end therein for coupling with an electronics module, and the coupler including a threaded portion for mating with a threaded portion of another module of the detector assembly.

38. The scintillation module of claim 37, wherein the threaded portion is internally threaded.

* * * * *